US010842136B2

(12) United States Patent
Booth

(10) Patent No.: US 10,842,136 B2
(45) Date of Patent: Nov. 24, 2020

(54) FISH EGG INCUBATOR

(71) Applicant: Donald Allan Booth, Townsville (AU)

(72) Inventor: Donald Allan Booth, Townsville (AU)

(73) Assignee: David Allan Booth, Townsville (AU)

(*) Notice: Subject to any disclaimer, the term of this patent is extended or adjusted under 35 U.S.C. 154(b) by 276 days.

(21) Appl. No.: 15/567,414

(22) PCT Filed: Apr. 22, 2016

(86) PCT No.: PCT/AU2016/050293
§ 371 (c)(1),
(2) Date: Oct. 18, 2017

(87) PCT Pub. No.: WO2016/168898
PCT Pub. Date: Oct. 27, 2016

(65) Prior Publication Data
US 2018/0288979 A1    Oct. 11, 2018

(30) Foreign Application Priority Data

Apr. 22, 2015  (AU) ................................ 2015202070

(51) Int. Cl.
*A01K 61/00*  (2017.01)
*A01K 63/00*  (2017.01)
*A01K 61/17*  (2017.01)

(52) U.S. Cl.
CPC .............. *A01K 61/17* (2017.01); *A01K 63/00* (2013.01); *Y02A 40/81* (2018.01)

(58) Field of Classification Search
CPC ........ A01K 61/17; A01K 61/10; A01K 63/00; A01K 67/00; A01K 61/00; A01K 61/50; A01K 61/53; A01K 61/70
See application file for complete search history.

(56) References Cited

U.S. PATENT DOCUMENTS

| 68,871 A | 9/1867 | Green |
| 199,527 A | 1/1878 | Ferguson |
| 3,216,395 A * | 11/1965 | Girard .................. A01K 63/006 |
| | | 119/252 |
| 3,584,602 A * | 6/1971 | Stasio .................... A01K 61/17 |
| | | 119/252 |

(Continued)

FOREIGN PATENT DOCUMENTS

| CN | 102440683 A | 5/2012 |
| CN | 202222278 U | 5/2012 |

(Continued)

OTHER PUBLICATIONS

JP 2005-253314 Machine translation (Year: 2005).*

(Continued)

*Primary Examiner* — Son T Nguyen
(74) *Attorney, Agent, or Firm* — Cooper Legal Group, LLC

(57) ABSTRACT

A fish egg incubator including a housing containing a reciprocating mechanism, at least one connector assembly associated with the reciprocating mechanism, at least one perforated containing assembly for holding the fish eggs located at least partially below a water surface and which is associated with the connector assembly where in the reciprocating mechanism periodically moves the least one perforated containing assembly in the water in order to move the eggs in the at least one perforated containing assembly.

9 Claims, 10 Drawing Sheets

(56) References Cited

U.S. PATENT DOCUMENTS

| | | | | |
|---|---|---|---|---|
| 3,709,195 | A | * | 1/1973 | Tabb ............... A01K 61/60 119/208 |
| 3,900,004 | A | * | 8/1975 | Goldman ............ A01K 61/17 119/252 |
| 4,009,782 | A | * | 3/1977 | Grimshaw ........... B07C 5/342 209/551 |
| 4,080,929 | A | | 3/1978 | Millnitz |
| 4,422,376 | A | * | 12/1983 | Teraoka ............ B65C 9/1865 101/306 |
| 4,469,048 | A | * | 9/1984 | Dugan ............... A01K 73/12 119/211 |
| 4,742,798 | A | | 5/1988 | Blackett |
| 4,744,331 | A | * | 5/1988 | Whiffin ............. A01K 29/00 119/223 |
| 5,297,513 | A | * | 3/1994 | Musgrave ........... A01K 61/17 119/252 |
| 2003/0106499 | A1 | * | 6/2003 | Yamada ............. A01K 61/17 119/207 |
| 2003/0221629 | A1 | | 12/2003 | Cole et al. |
| 2011/0132271 | A1 | * | 6/2011 | Slembrouck ........ A01K 67/02 119/218 |
| 2015/0359206 | A1 | * | 12/2015 | Naess ............... A01K 63/04 119/215 |

FOREIGN PATENT DOCUMENTS

| | | | |
|---|---|---|---|
| JP | 2005253314 A | * | 9/2005 |
| JP | 2011115081 A | * | 6/2011 |
| KR | 101062753 | | 11/2018 |
| SU | 950259 A1 | | 8/1982 |

OTHER PUBLICATIONS

EP Search Report/Written Opinion cited in EP Application No. 16782402 dated Nov. 13, 2018, 8 pgs.

International Search Report and Written Opinion cited in PCT Application No. PCT/AU2016/050293 dated Jul. 26, 2016, pp. 1-8.

* cited by examiner

FISH EGG INCUBATOR

TECHNICAL FIELD

The present invention relates to a fish egg incubator and in particular to a fish egg incubator to ensure regular and controlled movement of fish eggs.

BACKGROUND ART

The eggs of some fish require regular movement in order to ensure that the eggs develop and hatch correctly. One particular species with such a requirement and which is popular with aquarium owners is mouth brooding cichlids but other species such as some catfish species have similar requirements.

The female parent normally achieves a regular movement and rotation by holding the eggs in her mouth and regularly moving her jaw up and down to rotate the eggs. The female fish normally does this for up to 30 days.

Fish breeders, both commercial and hobbyist will often try to increase the production of young by removing the eggs from the female soon after they are picked up by the female fish.

Devices known as "egg tumblers" or "egg rockers" can then be used to move the eggs and to achieve regular movement of the eggs. The conventional egg tumblers are driven by attachment to an airline which can be attached to the same pump from which air is supplied to the fish tank in which the fish are stored.

In many conventional devices, a container is provided with a lower gauze or net upon which the fish eggs or "fry" are located. An air tube is then provided into the container with an air outlet, normally in the form of an air stone or air diffuser provided in the container. Air is then bubbled into the container which is responsible for creating movement in the water in the container thereby moving the eggs sufficiently.

It will be clearly understood that, if a prior art publication is referred to herein, this reference does not constitute an admission that the publication forms part of the common general knowledge in the art in Australia or in any other country.

SUMMARY OF INVENTION

The present invention is directed to a fish egg incubator, which may at least partially overcome at least one of the abovementioned disadvantages or provide the consumer with a useful or commercial choice.

With the foregoing in view, the present invention in one form, resides broadly in a fish egg incubator including a housing containing a reciprocating mechanism, at least one connector assembly associated with the reciprocating mechanism, at least one perforated containing assembly for holding the fish eggs located at least partially below a water surface and which is associated with the connector assembly where in the reciprocating mechanism periodically moves the least one perforated containing assembly in the water in order to move the eggs in the at least one perforated containing assembly.

The speed and/or frequency of the movement of the mechanism is preferably adjustable to mimic the natural movement of the eggs of different species of fish. Each species has differing movement strength and frequencies for maximum development and hatching. The conventional air driven methods of bubbling that described above, has a high failure rate as it cannot replicate the natural frequency, strength and timing of the "agitation" provided by the invention.

The housing of the motorised fish egg incubator of the present invention is preferably substantially waterproof or splashproof. The housing will normally contain one or more components of the preferred motorised reciprocating mechanism. The housing is normally connected to a power source such as a mains power supply in order to supply power to the motorised reciprocating mechanism. Alternatively, a power source may be contained within the housing, for example one or more batteries which can be either removable and/or replaceable. In some embodiments, a renewable energy source such as a photovoltaic cell or collect that can be used to power the device.

The housing will preferably have a containing portion with a lid that can be removed from the containing portion to allow access to components within the housing. The housing will typically mount relative to a fish tank wall. An appropriate mounting assembly is preferably provided relative to the housing.

According to a particularly preferred embodiment, the mounting assembly will preferably allow the housing to be attached relative to an upper edge of one of the walls of the fish tank and cantilever out over the water in the tank. Preferably, a clamping device is provided allowing a fast and easy attachment and removal of the housing relative to the fish tank wall.

In the most preferred form, the housing is preferably provided with a U-shaped portion in order to receive an edge portion of a wall. A clamping portion or plate is provided in association with the U-shaped portion. One or more threaded members is preferably provided in order to abut one side of the tank wall and force a part of the U-shaped portion against the other side of the tank wall in order to secure the housing relative thereto. Preferably, each threaded member can be provided with an appropriate gripping portion such as a thumb wheel.

The housing also preferably contains a reciprocating mechanism normally in the form of a reciprocating solenoid or electrical motor in order to provide the reciprocating movement. As the name suggests, a reciprocating solenoid normally provides a reciprocating motion. An electrical motor on the other hand normally has a rotating output. The rotating output is therefore preferably adapted to a reciprocating movement through the provision of an adapter. The output from the housing is preferably spaced from the wall (or the mounting assembly) in order to space the perforated containing assemblies from the wall to prevent bumping.

The reciprocating mechanism may alternatively be or include a hydraulic or pneumatic mechanism for moving the at least one connector mechanism in a reciprocating motion.

According to a preferred embodiment, the adapter is or includes an L-shaped arm extending from the rotating output of the electrical motor which is appropriately oriented to raise and lower a portion of the L-shaped arm to which the at least one connector assembly is connected. According to this particular configuration, there will be an element of lateral movement as well as reciprocation but this is an additional advantage of the invention as the movement will occur in more than one direction. Alternatively, the connector mechanism can be eccentrically mounted.

The housing is typically located spaced from the water surface in the tank.

The incubator of the present invention also includes at least one connector mechanism associated with the reciprocating mechanism. The purpose of the connector mechanism is to ensure that the fish eggs are located under the water surface to ensure the survival of the eggs, even if portions of the perforated containing assemblies are above the water surface at any time. The at least one connector mechanism will therefore preferably be elongate. The simplest connector mechanism will be in the form of an elongate rod or similar but more complex mechanisms may be provided.

The preferred elongate rod will typically attach to the adapter of the electrical motor or directly to the reciprocating solenoid output which normally extends from the housing and supports the at least one perforated containing assembly in the water. The connector mechanism may be length adjustable in order to account for differences or variations in the water level such as for evaporation for example.

Normally, the at least one connector mechanism will have an attachment configuration at both ends. According to a preferred embodiment, the upper attachment configuration is or includes a hook or similar which can be located through an appropriate opening in or over an appropriate extension on the adapter or solenoid output.

A cross piece is normally provided at a lower end of the at least one connector mechanism in order to mount at least one perforated containing assembly relative thereto. Normally, at least a pair of perforated containing assemblies is provided relative to the cross piece and preferably, the number of perforated containing assemblies is balanced relative to the cross piece, for example, one on either end of the cross piece. This will assist with maintaining the cross piece and the perforated containing assemblies level in the water.

The cross piece is normally elongate. The cross piece will normally extend substantially perpendicular to the preferred connector rod at a lower end thereof. There is normally a substantially centrally located attachment portion in order to attach the attachment configuration of the at least one connector mechanism. According to the most preferred embodiment, the attachment portion of the cross piece is or includes an eye or opening which will allow engagement with the preferred hook of the at least one connector mechanism. According to the most preferred embodiment, the attachment between the cross piece in the lower end of the connection mechanism is such that forcing both directions of the reciprocation can be transmitted to the cross piece. Therefore, the preferred hook at the lower end of the at least one connector mechanism is preferably received closely within the preferred central eye or opening.

The cross piece may mount the perforated containing assemblies in any way. Preferably, the perforated containing assemblies are removably mounted to the crosspiece. One very simple way in which the perforated containing assemblies can be mounted to the cross piece is to have the crosspiece extend through one or more openings in the perforated containing assemblies. Preferably the perforated containing assemblies are rigid but a frame and flexible mesh can be provided.

Similarly, one very simple way in which the perforated containing assemblies can be maintained on the cross piece is to provide a removable retaining cap on either end of the cross piece in order to prevent lateral movement of the perforated containing assemblies against movement unless the retaining cap is removed. The retaining cap can be attached to the crosspiece in any way such as by friction or interference fit or by providing a thread arrangement on the cross piece and retaining cap.

The incubator of the present invention also includes at least one perforated containing assembly. Normally, more than one perforated containing assembly will be provided. Each perforated containing assembly can have any shape, and any size. Further, different sized containing assemblies can be provided on the same cross piece. Any number of perforated containing assemblies can be provided as long as appropriate support for connection to the at least one connector mechanism is provided as well.

Each perforated containing assembly may be provided with a lid and preferably, any lid may be perforated as well. The perforation of any lid provided will allow water movement through the lid as well as the containing assembly which may promote movement of the eggs but minimise any damage thereto.

Although the preferred containing assemblies may have any shape, the preferred shape is at least partially spherical. It is particularly preferred that the preferred containing assemblies are hemispherical or similar.

The perforations in the perforated containing assemblies are preferably regular. It is preferred that the containing assemblies are formed using a mesh or similar allowing water to flow through the openings in the perforated containing assemblies on both the upstroke and downstroke of the incubator. This will disturb the eggs by creating a disturbed water flow within the perforated containing assemblies.

Using the device of the present invention means that the eggs will be rotated at regular intervals because of the reciprocating movement. Still further, the eggs will not be damaged by moving them too quickly as the speed at which the eggs are moved within the perforated containing assembly will normally be at a consistent rate, controlled by the reciprocating mechanism. The prior art devices, being reliant on air diffusers have the effect that if the eggs are too close to the air diffusers, the eggs can be moved to vigorously which can cause damage to the eggs.

The mounting of the perforated containing assemblies with the ability for the containing assemblies to move relative to the cross piece and the cross piece being movable relative to the connector mechanism means that the agitation or movement of the eggs within the perforated containing assemblies, although controlled in terms of speed, is slightly chaotic or random which results in more thorough movement of the eggs within the containing assemblies decreasing the chance of damage thereto.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
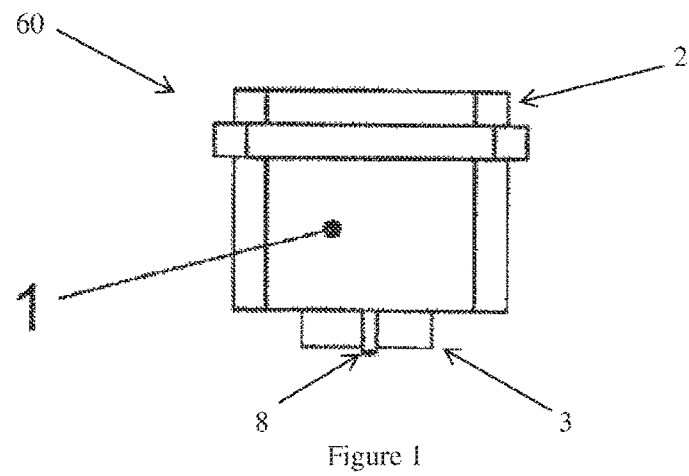
FIG. 1 is a front elevation view of the housing of a motorised fish egg incubator according to a preferred embodiment.
Figure 2:
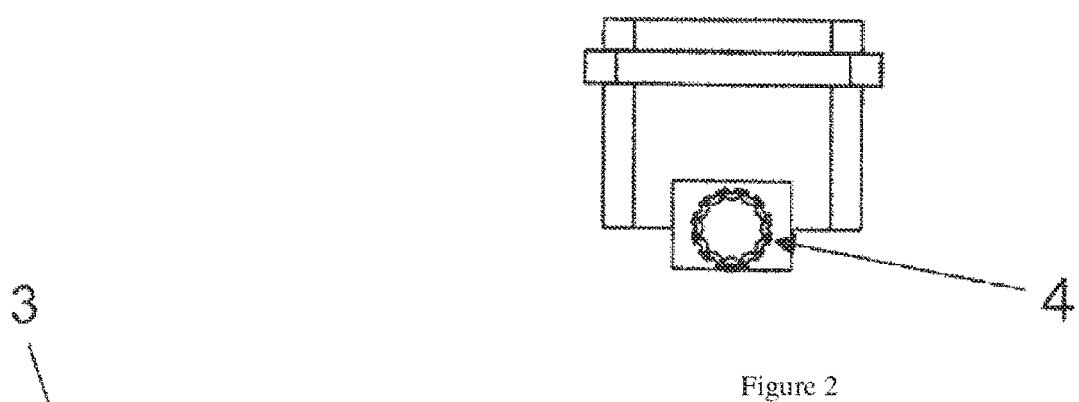
FIG. 2 is a rear elevation view of the housing illustrated in FIG. 1.

According to a particularly preferred embodiment of the present invention, a fish egg incubator 60 is provided.

The fish egg incubator 60 of the illustrated embodiment includes a housing 1 containing a reciprocating mechanism (either a reciprocating solenoid 7 or an electric motor 6), a connector arm 14 associated with the reciprocating mechanism, a pair of perforated containers 9 for holding the fish eggs 10 located below a water surface and which is associated with the connector arm 14 wherein the reciprocating mechanism periodically moves the pair of perforated containers 9 in the water in order to move the fish eggs 10.

The housing 1 of the illustrated embodiment is preferably substantially waterproof or splashproof and contains the reciprocating solenoid 7 or an electric motor 6 as well as a PCB 5 to control them. The housing 1 is normally connected to a power source such as a mains power supply in order to supply power to the motorised reciprocating mechanism. Alternatively, a power source may be contained within the housing, for example one or more batteries which can be either removable and/or replaceable. In some embodiments, a renewable energy source such as a photovoltaic cell or collect that can be used to power the device.

Figure 8:
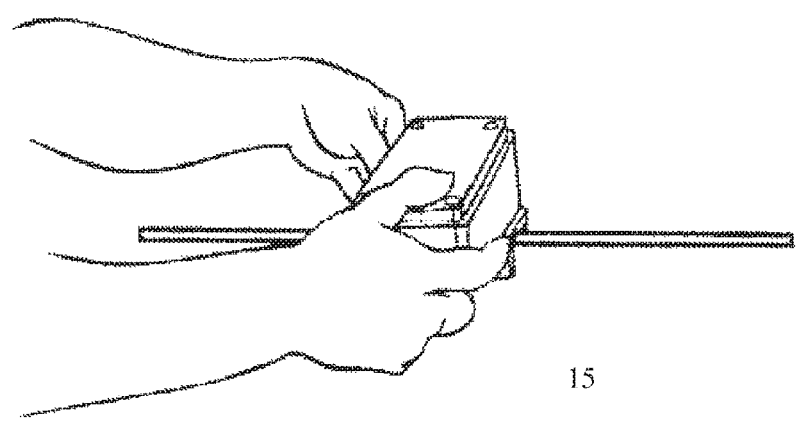
FIG. 8 is a schematic illustration showing the mounting of the housing of the preferred embodiment relative to a fish tank wall.
Figure 9:
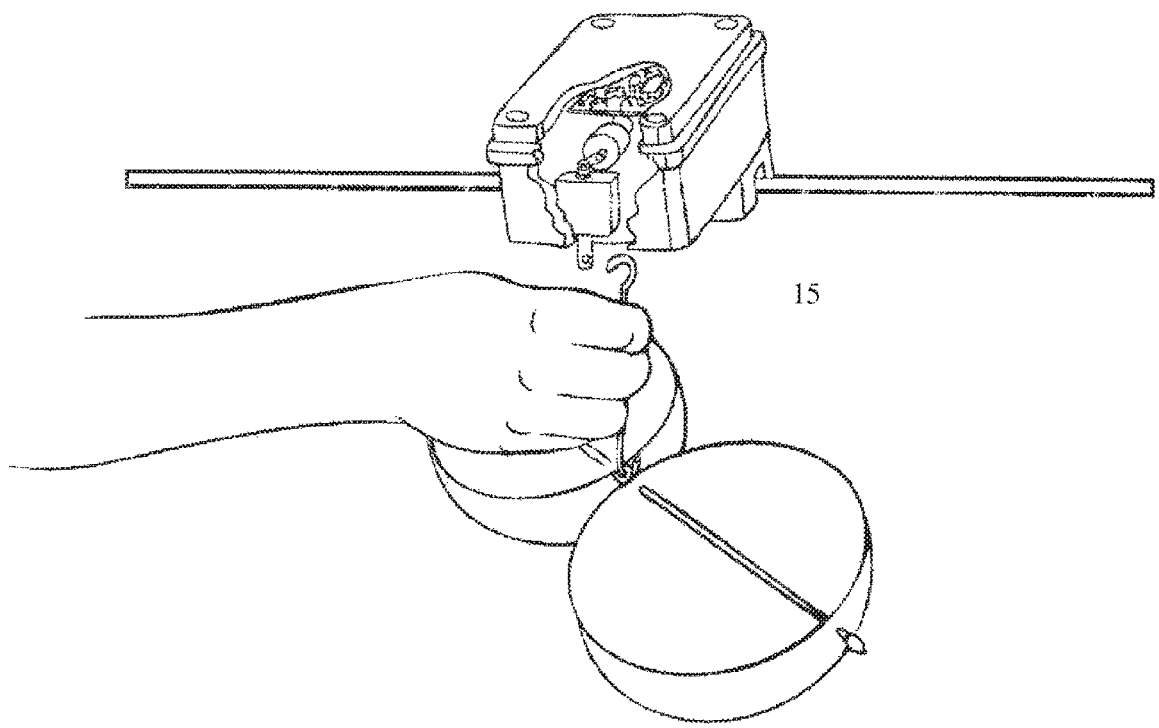
FIG. 9 is a schematic illustration showing the attachment of the perforated containing assemblies and connector egotism to the housing of the preferred embodiment.
Figure 10:
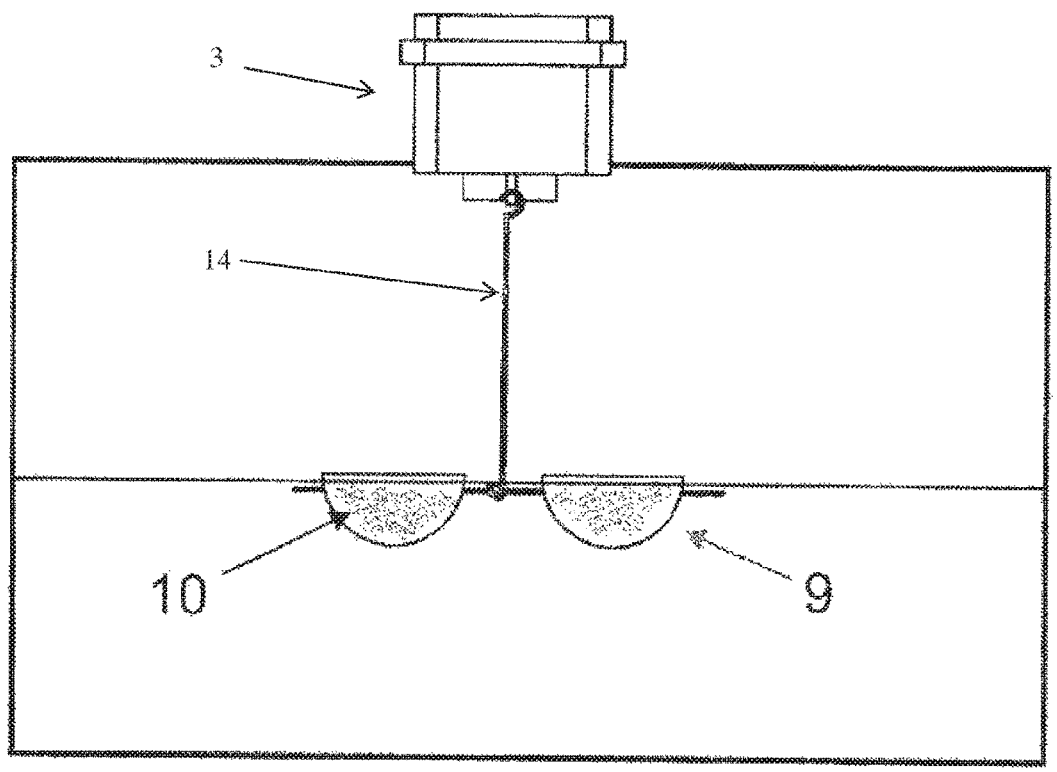
FIG. 10 is a front view showing the relative positioning of the perforated containing assemblies within a fish tank according to a preferred embodiment.
Figure 11:
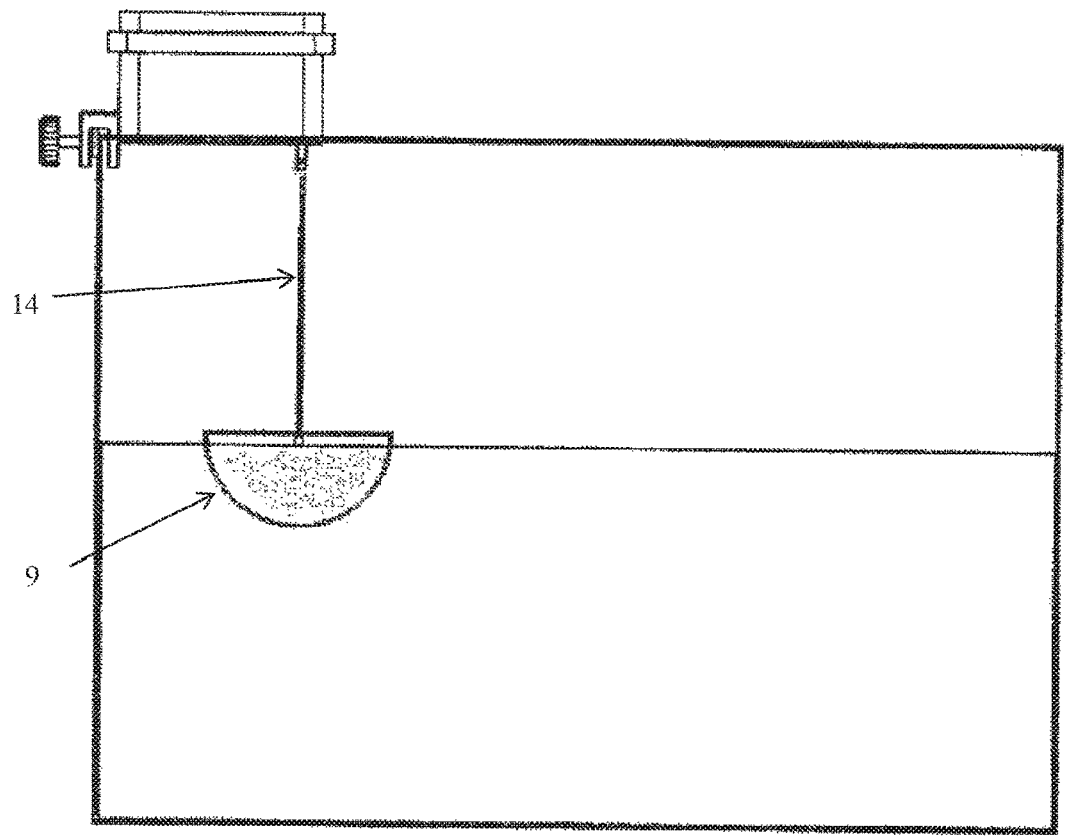
FIG. 11 is a side view of the configuration illustrated in FIG. 10.
Figure 12:
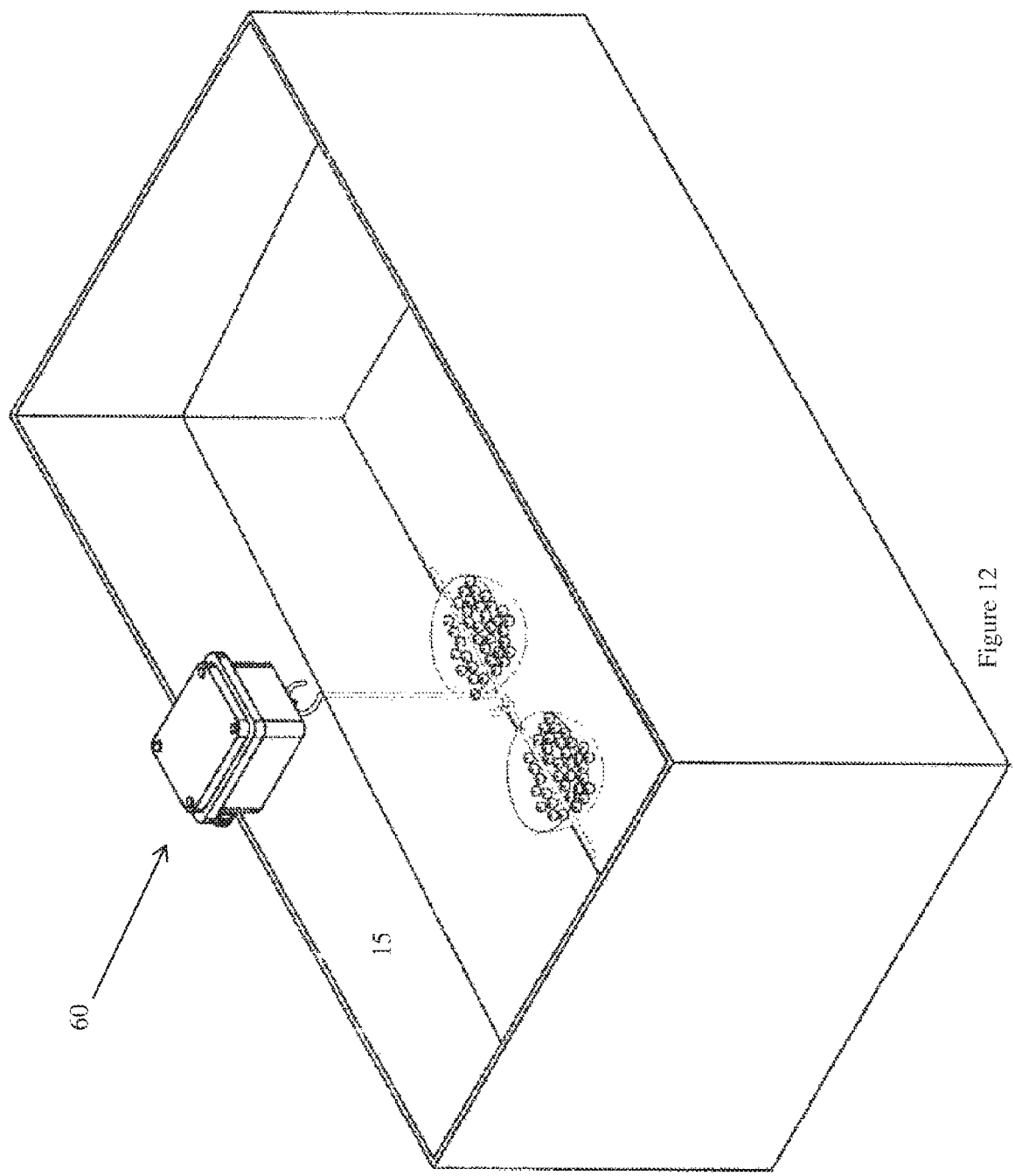
FIG. 12 is an isometric view of the incubator of the preferred embodiment in use.

The housing 1 has a containing portion with a lid 2 that can be removed from the containing portion to allow access to components within the housing. The housing will typically mount relative to a fish tank wall 15 as illustrated in FIGS. 8, 10 and 11.

According to the illustrated preferred embodiment, the mounting assembly allows the housing to be attached relative to an upper edge of one of the walls 15 of the fish tank.

Figure 3:
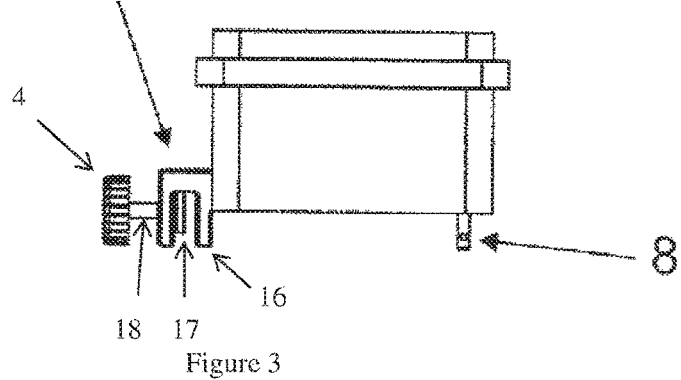
FIG. 3 is a side elevation view of the housing illustrated in FIG. 1.
Figure 4:
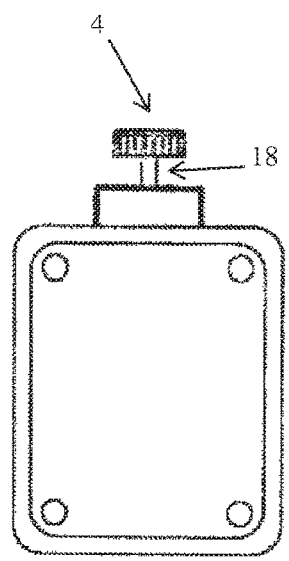
FIG. 4 is a plan view of the housing illustrated in FIG. 1.

In the most preferred form illustrated in FIG. 3, the mounting assembly 3 is provided with a U-shaped portion 16 in order to receive an edge portion of a wall. A clamping plate 17 is provided in association with the U-shaped portion 16. A threaded member 18 is provided in order to move the clamping plate 17 to abut one side of the tank wall 15 and force a part of the U-shaped portion 16 against the other side of the tank wall 15 in order to secure the housing 1 relative thereto. The threaded member 18 is provided with an appropriate gripping portion such as a thumb wheel 4.

The housing 1 also contains either a reciprocating solenoid 7 or electric motor 6 in order to provide the reciprocating movement. As the name suggests, a reciprocating solenoid 7 normally provides a reciprocating motion. The electric motor 6 on the other hand normally has a rotating output 19. The rotating output 19 is therefore preferably adapted to provide a reciprocating movement through the provision of an adapter.

Figure 5:
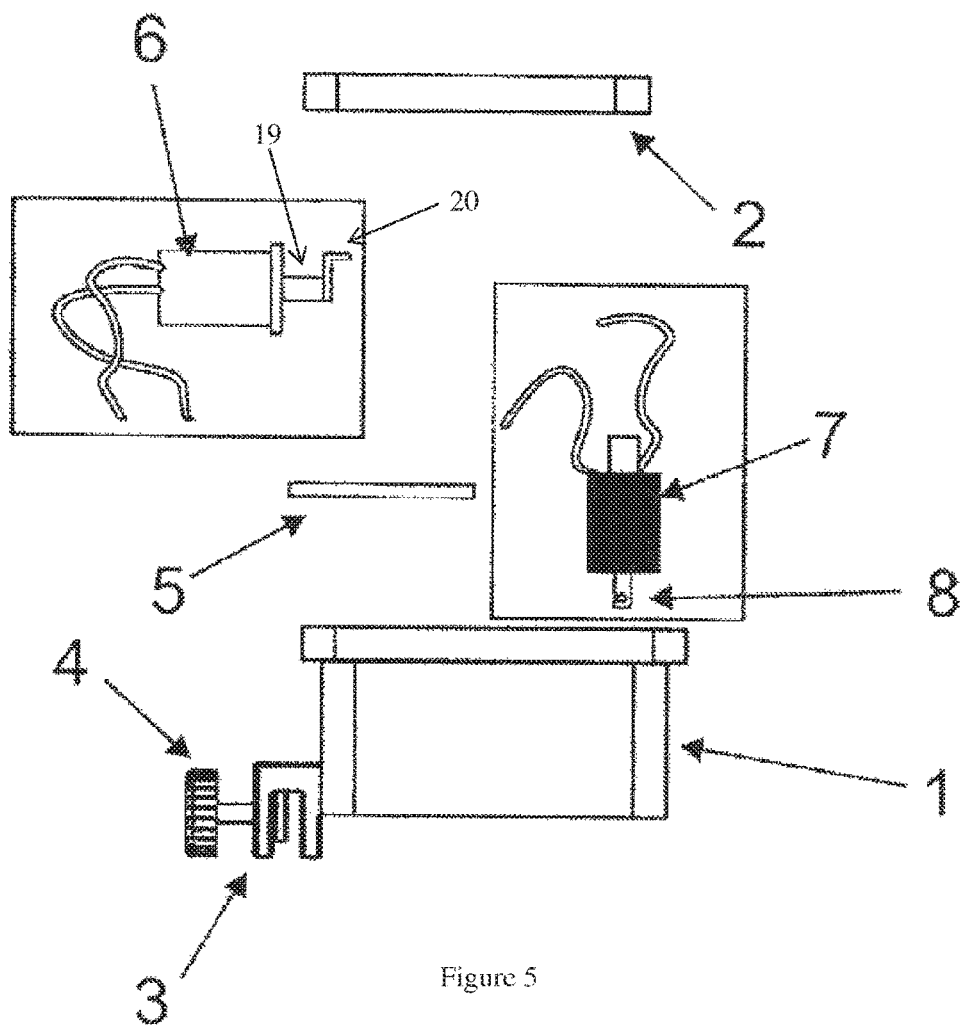
FIG. 5 is an exploded view of the housing and components according to a preferred embodiment of the present invention.
Figure 6:
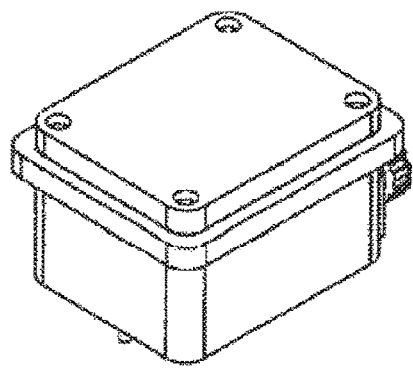
FIG. 6 is an isometric view from above of the housing illustrated in FIG. 1.

According to the embodiment illustrated in FIG. 5, the adapter includes an L-shaped arm 20 extending from the rotating output 19 of the electrical motor which is appropriately oriented to raise and lower a portion of the arm 20 to which the connector arm 14 is connected.

The housing is typically located spaced from the water surface in the tank as illustrated in FIGS. 8, 10 and 11.

Figure 7:
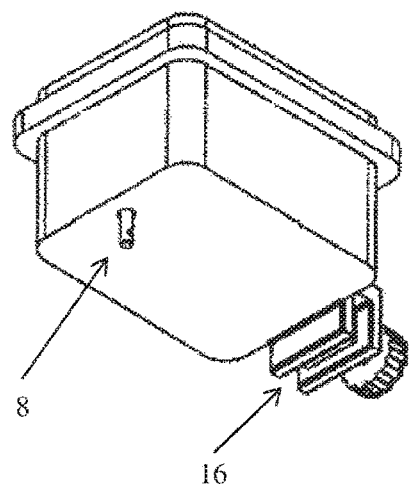
FIG. 7 is an isometric view from below of the housing illustrated in FIG. 1.

The simplest connector arm provided is that illustrated in the form of an elongate rod 14. The elongate rod is attached to the adapter of the electrical motor 6 or directly to the reciprocating solenoid output 8 which normally extends from the housing 1 as illustrated in FIG. 7 and supports the perforated containers 9 in the water.

Normally as illustrated, the connector rod 14 has a hook or similar at both ends, which can be located through an appropriate opening in the solenoid output 8 at an upper end.

Figure 13:
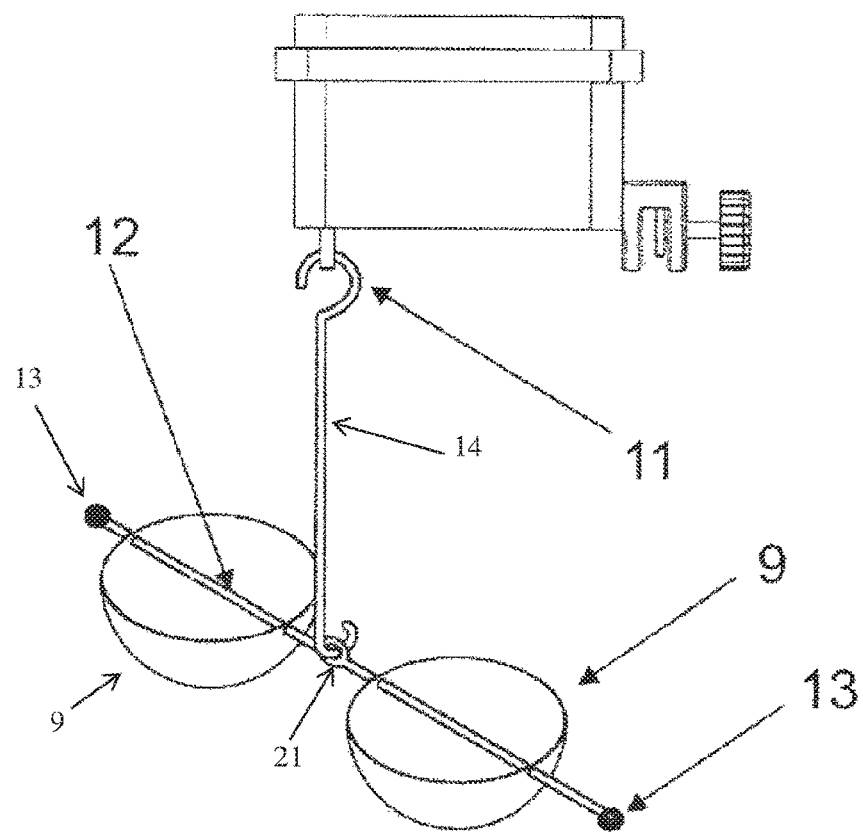
FIG. 13 is a side elevation view of the incubator of the preferred embodiment in the assembled form.
Figure 14:
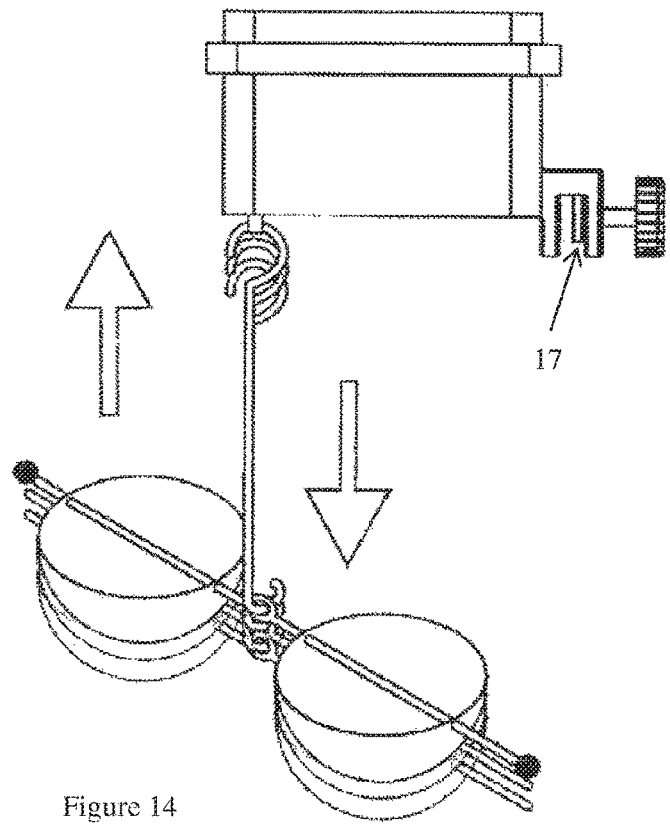
FIG. 14 is a side elevation view of the incubator showing the movement of the perforated containing assemblies.
Figure 15:
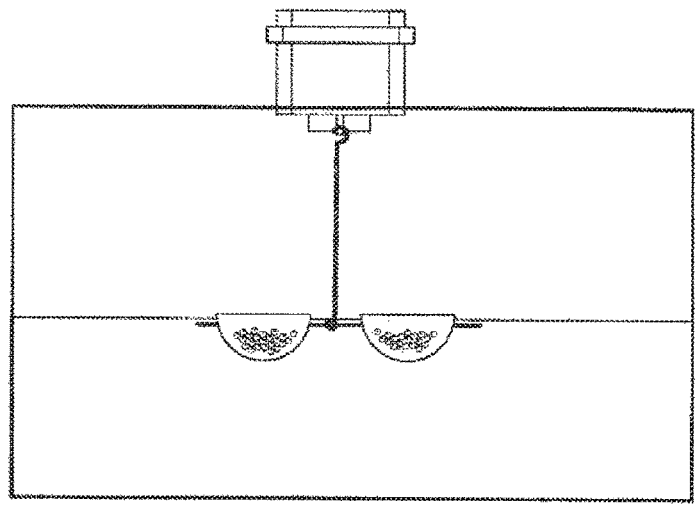
FIG. 15 shows the initial position of the incubator of the preferred embodiment.

As illustrated in FIG. 13 in particular, a cross piece 12 is provided at a lower end of the connector rod 14 in order to mount the perforated containers 9 relative thereto. The cross piece 12 extends substantially perpendicularly to the connector rod 14 and a central eye or opening 21 provided on the cross piece 12 allows engagement with the hook at the lower end of the connector arm 14. According to the most preferred embodiment illustrated, the attachment between the cross piece 12 and the lower end of the connection arm 14 is such that force in both directions of the reciprocation is transmitted to the cross piece 12. Therefore, the hook at the lower end of the connector arm 14 is normally received closely within in the central eye or opening 21.

In the illustrated embodiment, the perforated containers 9 are removably mounted to the crosspiece 12. One very simple way in which the perforated containing assemblies can be mounted to the cross piece is to have the crosspiece 12 extend through one or more openings in the perforated containers 9 as illustrated in FIG. 13.

Similarly, one very simple way in which the perforated containers 9 can be maintained on the cross piece 12 is to provide a removable retaining cap 13 on either end of the cross piece 12 in order to prevent lateral movement of the perforated containers 9 against movement unless the retaining cap 13 is removed. The retaining cap can be attached to the crosspiece in any way such as by friction or interference fit or by providing a thread arrangement on the cross piece and retaining cap.

Each perforated containers 9 can have any shape, and any size. Further, different sized containers 9 can be provided on the same cross piece 12 or at different times during the incubation period. In the illustrated embodiment, a pair of plastic mesh containers 9 are provided.

Although the preferred perforated containers 9 may have any shape, the preferred shape is at least partially spherical.

Figure 16:
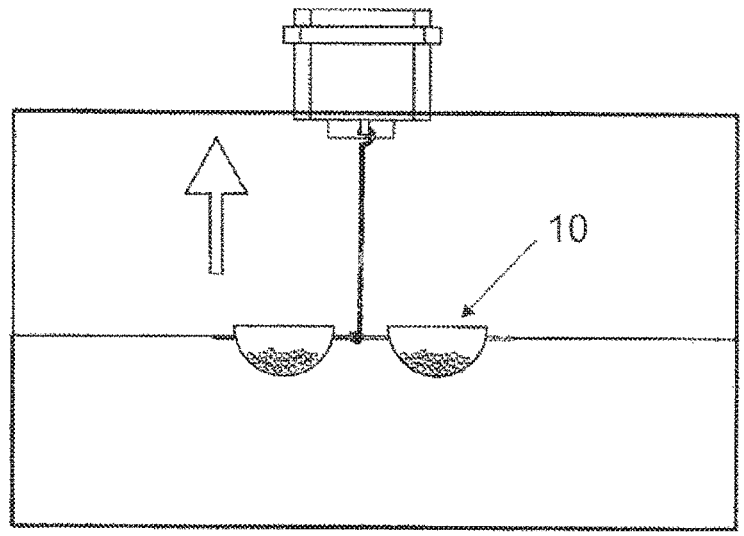
FIG. 16 shows the movement of the perforated containing assemblies of the incubator illustrated in FIG. 15 on the upstroke.
Figure 17:
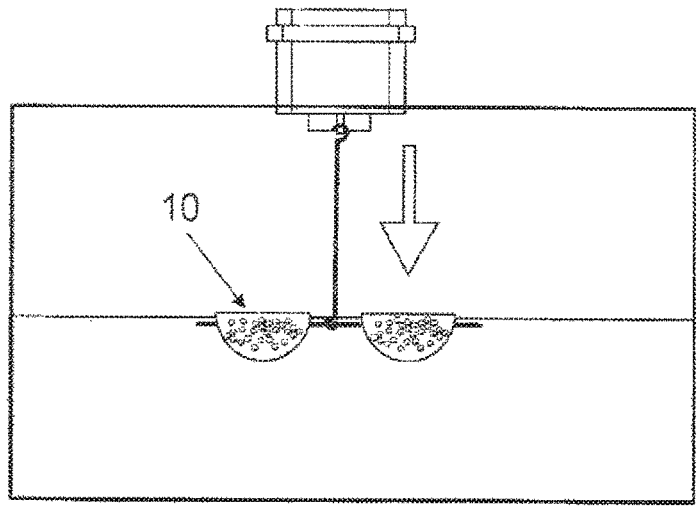
FIG. 17 shows the movement of the perforated containing assemblies of the incubator illustrated in FIG. 15 on the downstroke.

The perforations in the perforated containers 9 are preferably regular. It is preferred that the perforated containers 9 are formed using a mesh or similar allowing water to flow through the openings in the perforated containing assemblies on both the upstroke and downstroke of the incubator as illustrated in FIGS. 16 and 17. This will disturb the eggs by creating a disturbed water flow within the perforated containers 9. In the preferred embodiment, the PCB 5 controls the movement such that the perforated containers are moved every 30 seconds for a period of 2 seconds, a 1 second upstroke and a 1 second downstroke. As mentioned above, the PCB can be programmed to mimic the natural movement of the eggs of different species of fish as different species may have differing movement strength and frequencies for maximum development and hatching The timing of the movement will vary depending upon the species of fish being incubated. Generally the timing of the movement will be between 10 seconds and 90 seconds.

Figure 18:
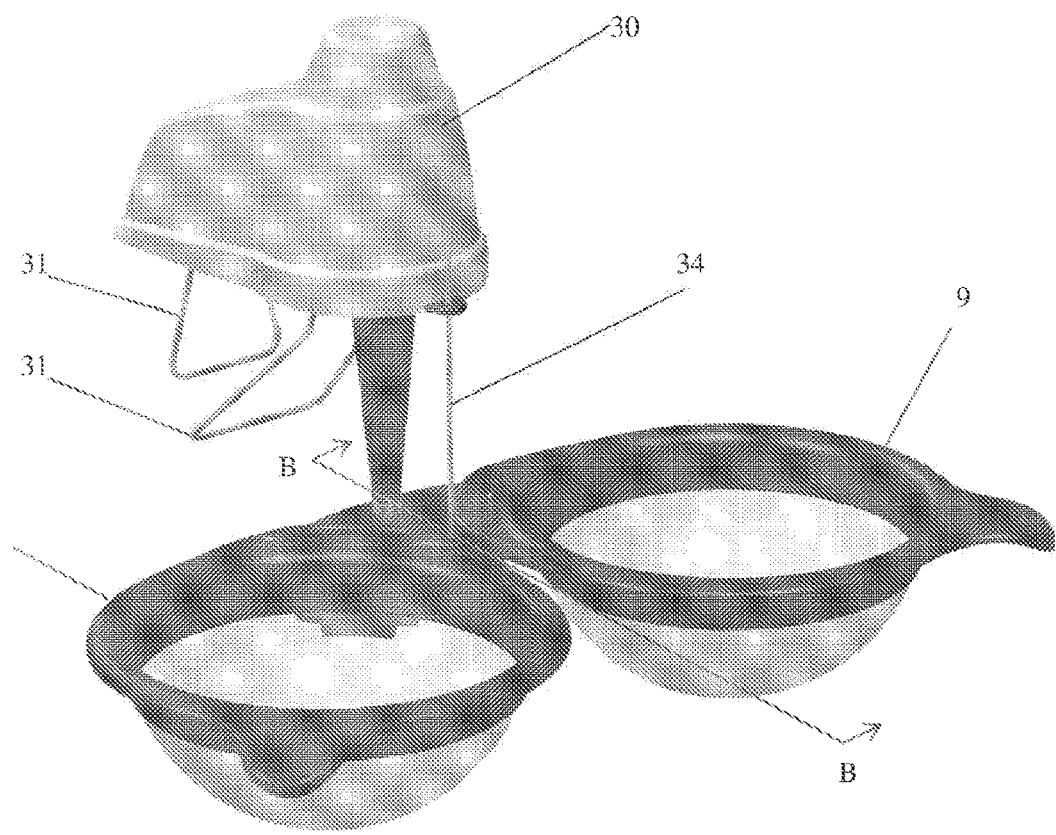
FIG. 18 is an isometric view from the front of an incubator according to an alternative preferred embodiment.

An alternative configuration having the same operating principles, is illustrated in FIGS. 18 to 23. The embodiment illustrated in these figures is similar in many ways to the embodiment illustrated in the earlier figures but in a more refined condition. As illustrated in FIG. 18, the housing is provided with a substantially waterproof top cover 30 and is mounted relative to the wall of a tank 15 through the provision of a pair of opposed, resilient spring members 31. A substantially vertical protective guide 32 extends downwardly from the housing in order to protect an elongate drive rod 33 relative to which the containers 9 are mounted.

An elongate guide rod 34 is provided substantially parallel, but spaced apart from the drive rod 33 in order to maintain the containers 9 in a substantially horizontal alignment, particularly during movement. A lower end of the guide rod 34 engages with the cross piece 12 relative to which the containers 9 are mounted and an upper end of the guide rod 34 is movable within a during movement of the containers 9 driven by the solenoid 7. As illustrated more clearly in FIG. 22, the lower ends of each of the drive rod 33 and the guide rod 34 is received in a correspondingly shaped and sized portions 37 associated with the cross piece 12 in a press the configuration, typically maintained engagement through friction. A dampener 38, in the preferred embodiment manufactured of rubber or similar material is provided adjacent a lower end of the drive rod in order to prevent the solenoid from striking the top cover 30 of the housing one during the return stroke.

Figure 19:
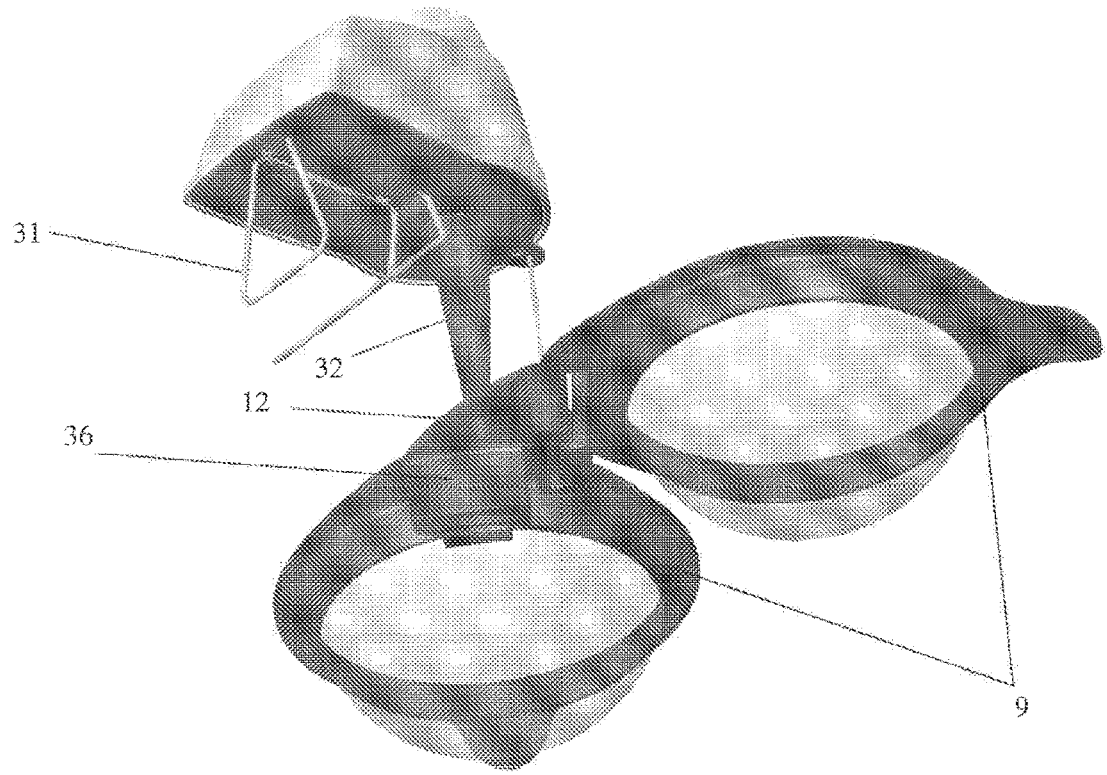
FIG. 19 is an isometric view from below of the incubator illustrated in FIG. 18.
Figure 20:
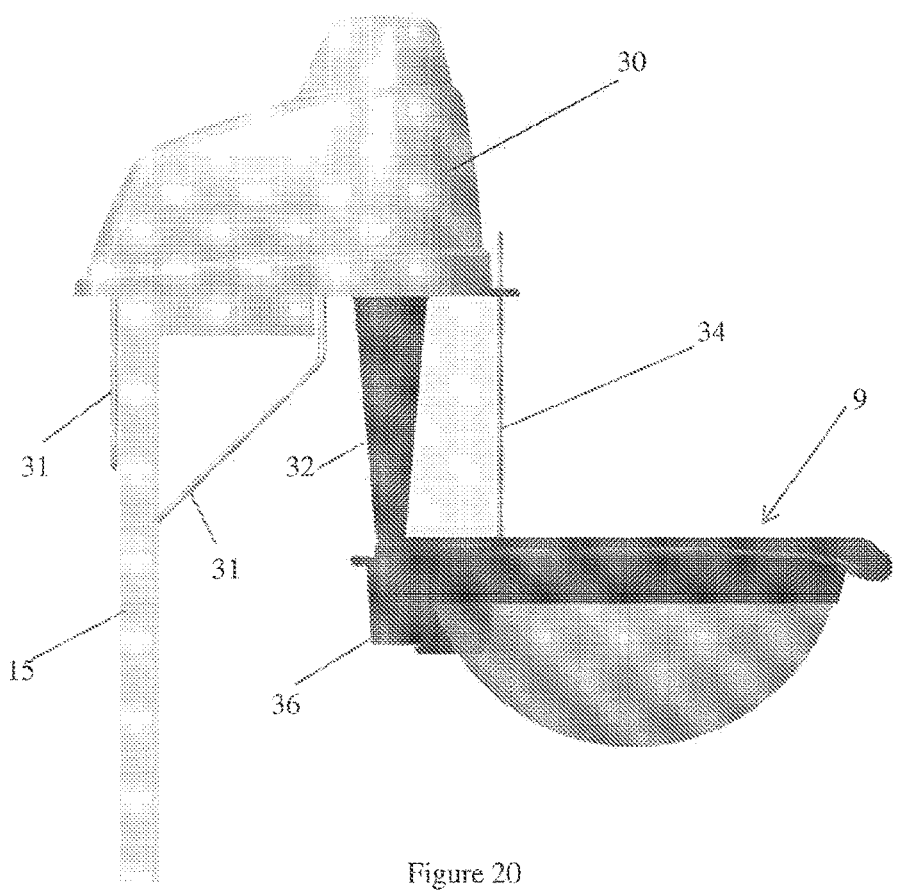
FIG. 20 is a side elevation view of the incubator illustrated in FIG. 18.
Figure 21:
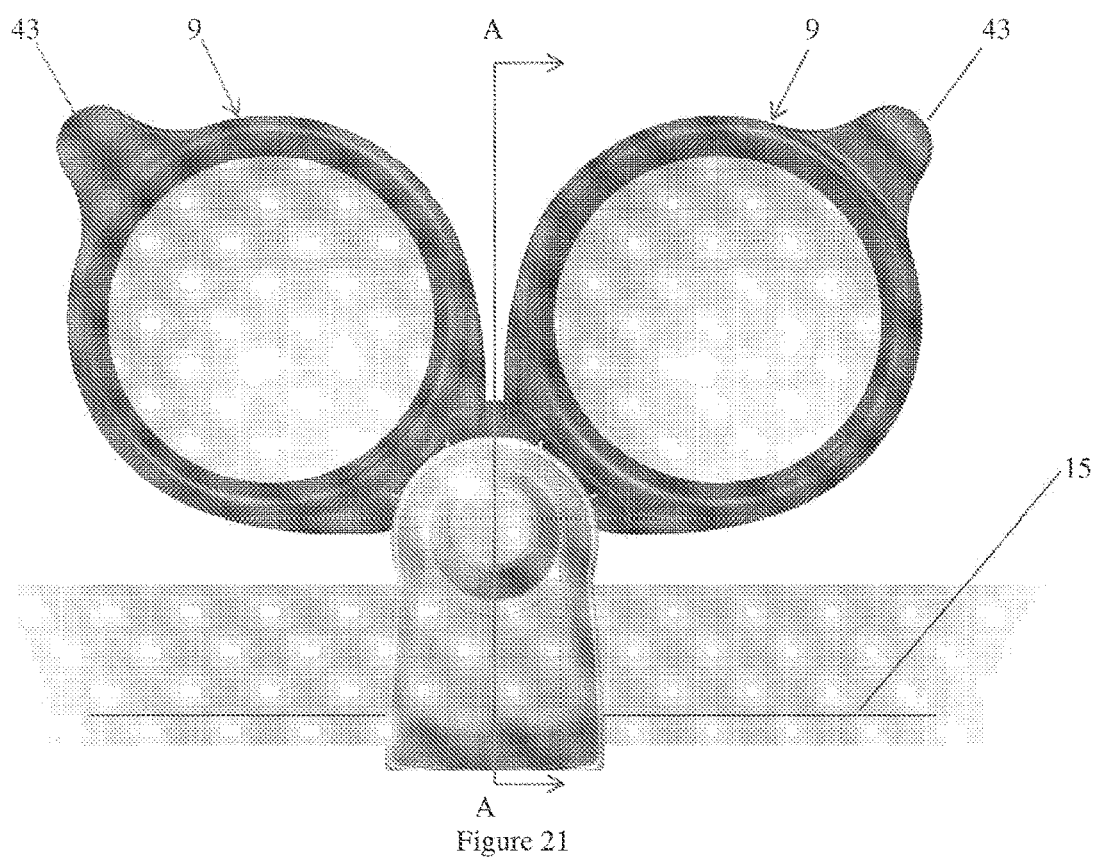
FIG. 21 is a plan view of the incubator illustrated in FIG. 18.
Figure 22:
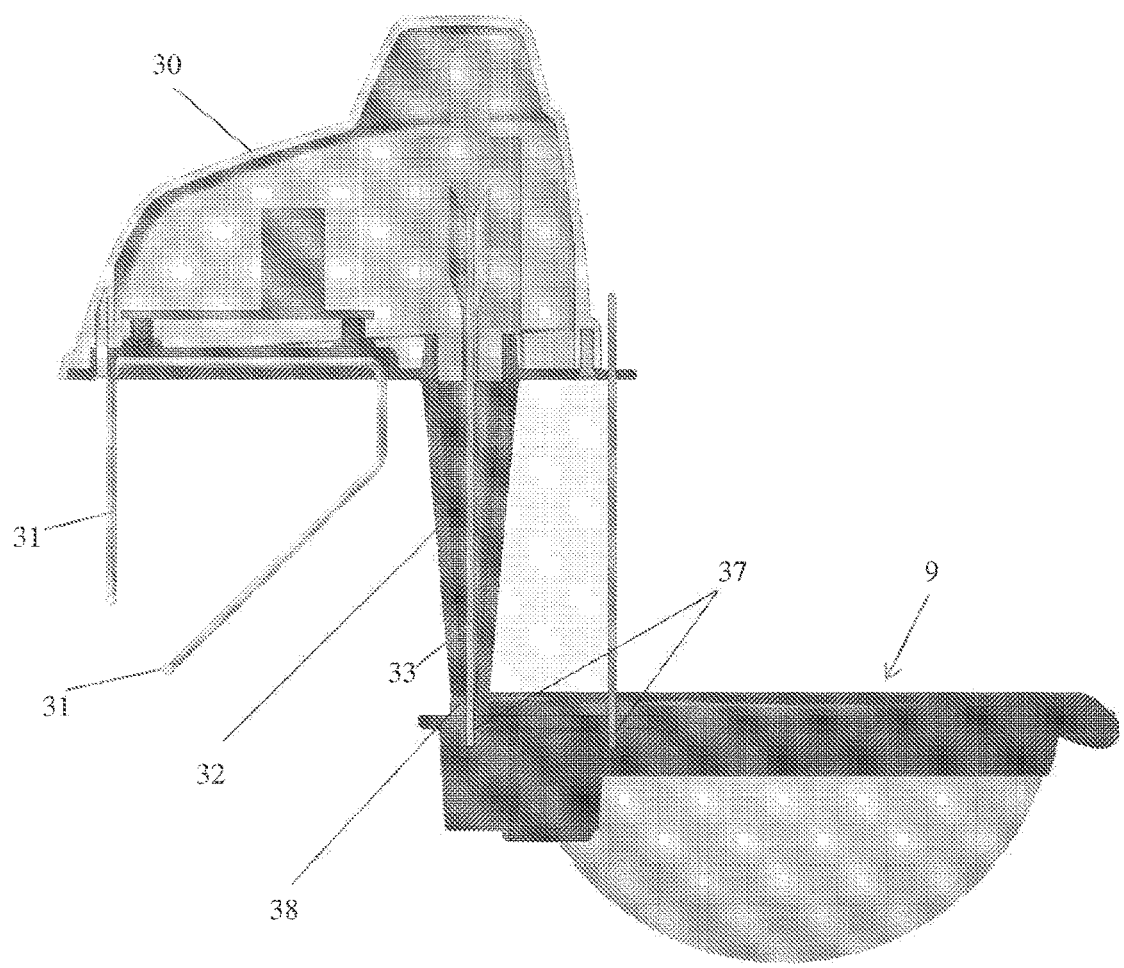
FIG. 22 is a sectional side elevation view of the incubator illustrated in FIG. 18 along line A-A as illustrated in FIG. 21.

As illustrated in FIG. 19, the containers 9 are releasably mounted relative to the cross piece through the provision of a respective container mount 36.

Figure 23:
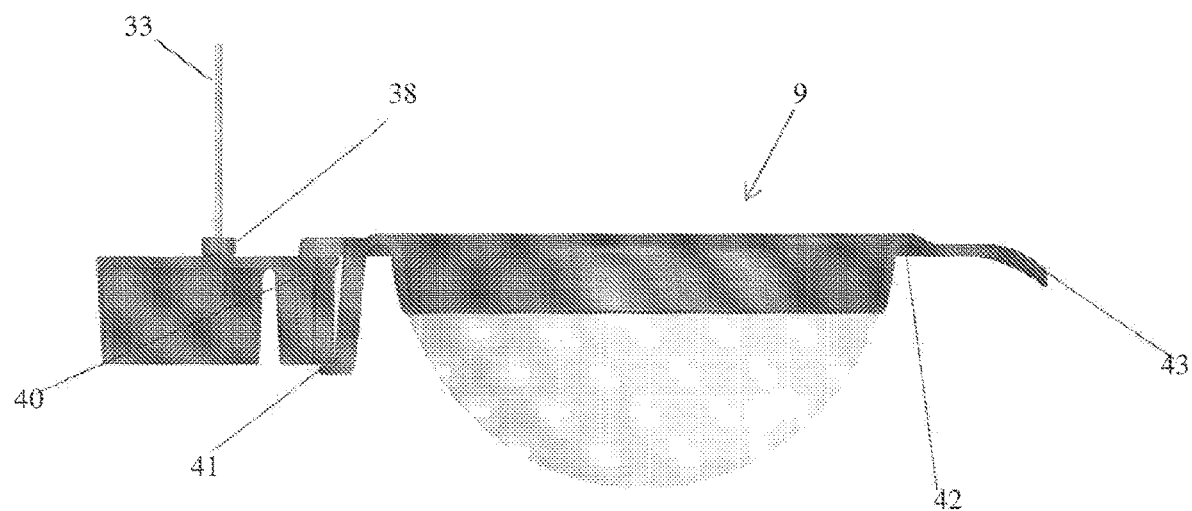
FIG. 23 is a sectioned view of the containing assembly mounting portion illustrated in FIG. 18 along line B-B as illustrated in FIG. 18.

The particularly preferred configuration of the container mount 36 and the engaging portion of the container 9 is illustrated best in FIG. 23. As illustrated in FIG. 23, each container mount is provided with a substantially vertical wall 39 and each container is provided with a locking return 40 and a lower retainer 41 in order to lock to the substantially vertical wall into securely attached the container 9 to the respective container mount 36 while still allowing a user to detach the container from the container mount by manually manipulating the lower retainer 41 away from the bottom edge of the vertical wall 39. Also illustrated in FIG. 23 is a preferred configuration of container having an upper circumferential rim made of plastic or similar and a lower, mesh portion with the rim being provided with an exaggerated lip 42 to provide the containers 9 with positive buoyancy and an enlarged finger tab 43 to aid the user in fitting and removing the containers relative to the crosspiece 12.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:
1. A fish egg incubator including:
a housing containing a reciprocating mechanism to create a reciprocating movement,
at least one connector assembly mounted to the reciprocating mechanism, and
at least one perforated containing assembly for holding fish eggs located at least partially below a water surface of water in a fish tank, a first spring member, and a second spring member spaced apart from the first spring member for receiving a wall of the fish tank wherein:
the at least one perforated containing assembly is mounted to the at least one connector assembly, such that the at least one connector assembly suspends the at least one perforated containing assembly in the water and such that movement of the reciprocating mechanism drives a corresponding movement of the at least one perforated containing assembly in the water in order to move the fish eggs in the at least one perforated containing assembly,
the at least one connector assembly includes an elongate rod extending downwardly from the housing,
a guide rod extends between the housing and a container mount in which the at least one perforated containing assembly is disposed, and
the guide rod is substantially parallel to the elongate rod, the elongate rod extends between the housing and the container mount, and a dampener is disposed between the elongate rod and the container mount.

2. A fish egg incubator as claimed in claim 1 wherein the reciprocating mechanism includes a reciprocating solenoid.

3. A fish egg incubator as claimed in claim 1 wherein the reciprocating mechanism includes an electric motor with rotating output and an adapter to adapt the rotating output to a reciprocating movement.

4. A fish egg incubator as claimed in claim 1 wherein an output from the housing is spaced apart from the first spring member and the second spring member.

5. A fish egg incubator as claimed in claim 1 wherein the at least one connector assembly is length adjustable in order to account for variations in water level of the water.

6. A fish egg incubator as claimed in claim 1 wherein:
the at least one perforated containing assembly comprises
at least a pair of perforated containing assemblies, and
the at least a pair of perforated containing assemblies is provided on the container mount.

7. A fish egg incubator as claimed in claim 1 wherein the at least one perforated containing assembly is rigid.

8. A fish egg incubator as claimed in claim 1, including
a protective guide extending between the housing and the
container mount, wherein the elongate rod is disposed within an interior of the protective guide.

9. A fish egg incubator as claimed in claim 1, wherein:
the at least one perforated containing assembly includes a
locking return for contacting a top surface of the container mount and a lower return for contacting a bottom surface of the container mount.

* * * * *